May 14, 1963
S. DRAKE ETAL
3,089,507
AIR EJECT SYSTEM CONTROL VALVE
Filed Aug. 11, 1961
2 Sheets-Sheet 1
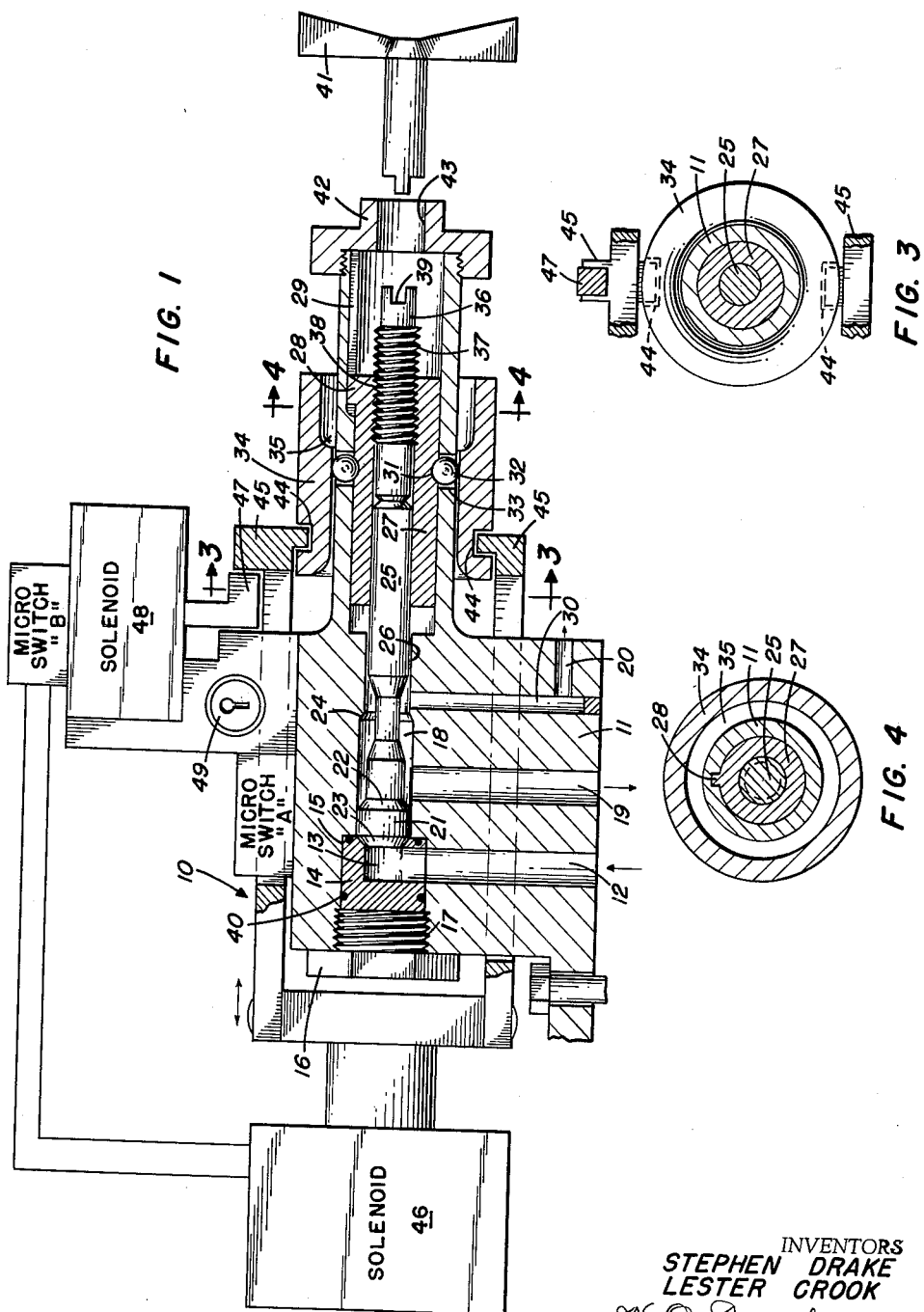
INVENTORS
STEPHEN DRAKE
LESTER CROOK
BY
ATTORNEYS
AGENT May 14, 1963  S. DRAKE ETAL  3,089,507
AIR EJECT SYSTEM CONTROL VALVE
Filed Aug. 11, 1961
2 Sheets-Sheet 2
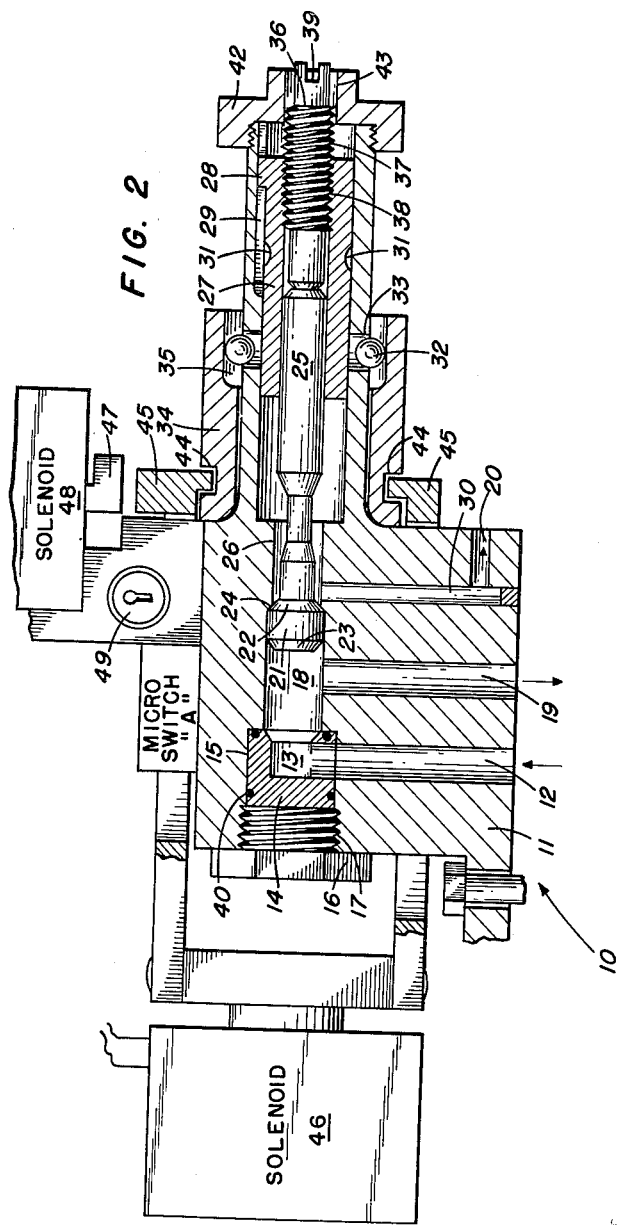
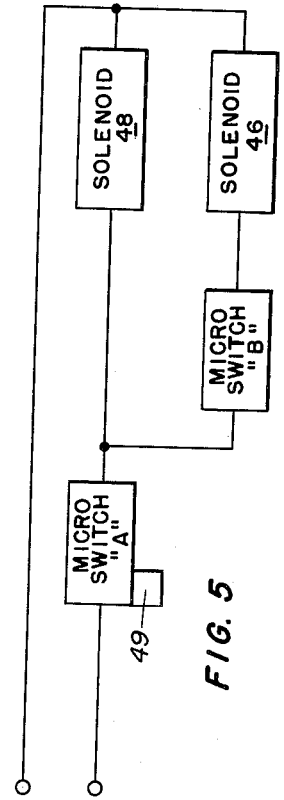
INVENTORS
STEPHEN DRAKE
LESTER CROOK
BY
ATTORNEYS
AGENT though the balls when the retaining sleeve is in its lowermost position are not prevented from moving radially outward into the undercut portion 35, they still serve as a positive lock to prevent the valve 21 from opening prematurely due to shock or vibration.

United States Patent Office
3,089,507
Patented May 14, 1963

3,089,507
AIR EJECT SYSTEM CONTROL VALVE
Stephen Drake, Sunnyvale, and Lester Crook, Mountain View, Calif., assignors, by mesne assignments, to the United States of America as represented by the Secretary of the Navy
Filed Aug. 11, 1961, Ser. No. 131,027
6 Claims. (Cl. 137—383)

The present invention relates to a poppet type control valve and more particularly to a poppet type control valve which has a positive lockout system and provides fast reliable opening upon actuation.

In the field of poppet type valves, it has been the general practice to employ either springs of various types or loading pressure such as compressed air to maintain the poppet valve on its seat while the valve is in its closed position.

Although such devices have served the basic purpose for which they were intended, they have not proved entirely satisfactory under all conditions of service. As a result of the varied applications and the associated requirements dictated thereby, many improvements over the conventional poppet type valve of the prior art are required.

In the various applications, such as launching systems, control systems, etc., the need has arisen from a poppet type valve that is provided with a positive lockout system preventing the opening of the valve under various conditions of shock and vibration. In addition, the requirement for a rapid, highly reliable valve in assuming its full open position has also presented itself. The present invention fulfills these needs and possesses many other desirable features.

The general purpose of this invention is to provide a poppet type control valve which embraces all the advantages of similarly employed poppet type control valves and possesses none of the aforedescribed disadvantages. To attain this, the present invention contemplates the use of a novel locking ball and ball retaining sleeve arrangement. The ball retaining sleeve is actuated by a solenoid which permits the valve to unseat itself and permit flow of fluid therethrough.

In addition to the locking sleeve a safety lock is provided to prevent the valve from being inadvertently actuated. The safety lock is also actuated by a solenoid which, when actuated, retracts the safety lock from its locked position permitting the locking sleeve to be retracted. It can readily be seen that the present invention provides several desirable safety features not possessed by the prior art.

An object of the present invention is to provide a compact, inexpensive valve that is relatively simple to operate.

Another object of the invention is to provide a valve that has a positive lockout system that will prevent opening of the valve under shock.

A further object is to provide a valve that has direct venting to prevent pressure build-up in case of leakage.

Still another object of the invention is the provision of a valve that provides fast reliable opening once actuated.

Other objects and many of the attendant advantages of this invention will be readily appreciated as the same becomes better understood by reference to the following detailed description when considered in connection with the accompanying drawings wherein:

FIG. 1 shows a plan view, partly in section, of a preferred embodiment of the invention showing the valve in its closed position.

FIG. 2 shows a plan view, partly in section, showing the valve in its open position.

FIG. 3 shows a section of the device taken on the line 3—3 of FIG. 1.

FIG. 4 illustrates a section of the device taken on the line 4—4 of FIG. 1.

FIG. 5 is a schematic of the electrical circuit energizing the solenoids.

Referring now to the drawings wherein like reference characters designate like or corresponding parts throughout the several views, there is shown in FIG. 1, illustrating a preferred embodiment, a sectional plan view of the invention with reference numeral 10 indicating generally a poppet type control valve.

The valve 10 includes a valve body 11 having an inlet port 12 extending therethrough and opening into a valve chamber 13. Valve chamber 13 is formed by a removable seat insert 14 which is received in bore 15 and held in position by a retaining plug 16. Valve seat insert 14 is made of any suitable material such as fiberglass impregnated Teflon which is commercially available on the open market. A pair of O-rings 40 are inserted in lands in said valve seat insert 14 to seal the area between the periphery of the valve seat insert 14 and the valve body 11. The retaining plug 16 is received in the valve body 11 by means of a threaded aperture 17. The valve chamber 13 opens into a bore 18 that extends the entire length of the valve body 11. Said bore 18 being centrally located within said valve body 11. An outlet port 19 opens into bore 18 and is thereby interconnected with inlet port 12 when the valve poppet 21 is off its seat 14. Outlet port 19 is vented to atmosphere via vent 20 when the valve 21 is closed.

Bore 18 is of varying diameters as it traverses the length of valve body 11. In the area of the valve seat insert 14 the diameter of bore 18 conforms to the outer diameter of the valve poppet 21. Valve poppet 21 is provided with an upper face 22 and a lower face 23. Lower face 23 seats on removable seat 14 when the valve 21 is in its lowermost position and upper face 22 seats on valve seat 24 when valve 21 is in its uppermost position. When valve 21 is in its lowermost position the outlet port 19 and that portion of bore 18 in the immediate area of upper seat 24 are vented to atmosphere via conduit 30 and vent port 20.

Immediately above upper seat 24 the bore 18 reduces in diameter to conform to the diameter of the valve stem 25. This diameter of bore 18 extends vertically for a sufficient distance to serve as a valve guide as shown at 26.

Immediately above the valve guide portion 26, the bore 18 increases to a diameter sufficiently large to accommodate a locking sleeve 27. The inner wall of the uppermost portion of bore 18 is provided with an integral key 28 that protrudes inwardly and extends a substantial length of the bore 18. Locking sleeve 27 is provided with a keyway 29 which receives key 28 and guides locking sleeve 27 as it moves vertically within the bore 18. The key 28 and keyway 29 also serve to prevent rotation of the locking sleeve 27. Locking sleeve 27 is also provided with a plurality of detents 31 that are capable of receiving locking balls 32. Locking balls 32 are received in bores 33 in valve body 11 and are held in place by means of retaining sleeve 34.

Radially outward of and concentric with the upper portion of valve body 11 is said ball retaining sleeve 34. This retaining sleeve 34 is capable of vertical movement on the outer periphery of valve body 11. Retaining sleeve 34 is provided with an undercut portion 35. When the sleeve 34 is in its lowermost position the locking balls 32 are free to roll into the undercut portion 35. Thus, the valve poppet 21 and stem 25 can move vertically provided that there is sufficient pressure on the underside of the valve 21 to raise it off its seat.

At the upper end of and in abutting relation to said valve stem 25 is the valve adjusting screw 36. The upper portion of said screw 36 is threaded at 37 to mate with the internal threads 38 on the locking sleeve 27. The uppermost portion of said adjusting screw 36 is provided with a slot 39 for receiving a removable valve seating handle 41.

Valve body 11 is enclosed at its uppermost end by cap 42 which is threaded to the valve body 11 and serves to keep foreign particles from entering the interior of valve body 11. Cap 42 is provided with an aperture 43 through which handle 41 may be inserted to adjust the seat pressure required for seating the valve poppet 21. It can readily be seen that the seating pressure required to seat valve 21 may be set to any desired pressure depending on the application of said valve 10. In addition, cap 42 also serves to absorb shock from the valve assembly on the opening stroke.

The outer periphery of ball retaining sleeve 34 is provided with a groove 44 which receives valve release yoke 45. Valve release yoke 45 is operably connected by suitable means, (dotted lines are used to show the connection, since various schemes may be employed) to solenoid 46.

As an added safety precaution to prevent inadvertent actuation of valve 10, there is a safety lock 47 which engages the underside of yoke 45. Safety lock 47 is actuated by solenoid 48. However, before safety lock 47 can be actuated, key lock 49 must first be unlocked.

FIG. 2 shows substantially the same structure as FIG. 1, except for the position of the valve stem 25, valve adjusting screw 36, locking sleeve 27, retaining sleeve 34 and locking balls 32. When the solenoid 46 is actuated the valve release yoke 45 is retracted pulling ball retaining sleeve 34 down and permitting locking balls 32 to roll out of detents 31 and into the relatively wider undercut portion 35, thereby releasing locking sleeve 27 so that valve stem 25 is free to move.

Since the underside of poppet valve 21 is under high pressure the valve is raised off its lower seat 14 and the upper face of poppet valve 21 seats on the upper seat 24 thus closing off the venting conduit 30 and vent 20 interconnecting outlet port 19 with inlet port 12, permitting flow of fluid therethrough.

FIG. 3, which is a sectional view taken along the line 3—3 of FIG. 1, shows the relationship of safety lock 47, valve release yoke 45, valve body 11, locking sleeve 27 and valve stem 25 when the valve poppet 21 is in its closed position.

FIG. 4 is a sectional view taken along the line 4—4 showing the concentric relationship of the elements at that point along with undercut portion 35 of ball retaining sleeve 34.

FIG. 5 is an electrical schematic of the wiring arrangement for actuating solenoids 46 and 48. As can be seen from this schematic, unlocking key lock 49 trips interlock switch "A." Solenoid 48 may then be energized retracting safety lock 47. Safety lock 47 actuates limit switch "B," thus energizing solenoid 46 to retract the ball retaining sleeve a sufficient distance to permit locking balls 32 to roll out of detents 31 allowing the valve stem 25 and poppet valve 21 to be unseated.

In operation, assuming the valve is connected to a pressurized system, the sequence of steps in closing and actuating the valve is as follows:

The poppet valve 21 is manually seated in its closed position by allowing locking balls 32 to drop into detents 31 in locking sleeve 27. The desired seating pressure is applied to valve seat 15 by tightening adjusting screw 36 with the seating handle 41. The valve 21 is locked in its closed position by moving solenoid operated safety lock 47 between the valve body 11 and valve release yoke 45 and further secured by key lock 49.

After the valve poppet 21 has been seated on seat 14 seating handle 41 may be removed to prevent manual opening of valve poppet 21. When the valve 21 is in its closed position the inlet port 12 is sealed off and outlet port 19 is vented by means of conduit 30 and vent 20.

It can readily be seen that the valve 10 is capable of stopping leakage by making the necessary adjustment with seating handle 41 on adjustment screw 36. Also, the vent 20 provides direct venting in case of undetected leakage thereby preventing a pressure build-up which could conceivably actuate valve 10.

Opening valve 10 is effected by first unlocking key lock 49 which trips interlock switch "A." Solenoid 48 may then be energized retracting safety lock 47. Safety lock 47 actuates limit switch "B" thus energizing solenoid 46. When solenoid 46 is energized the valve release yoke 45 is retracted, lowering ball retaining sleeve 34 to the position shown in FIG. 2. Locking balls 32 are thus released into undercut portion 35 of retaining sleeve 34. With locking balls 32 released, the valve stem 25, adjusting screw 36 and locking sleeve 27 are thus raised up by inlet pressure acting on valve poppet 21. The upper face of valve poppet 21 then seats on the upper seat 24, sealing off vent conduit 30 and vent 20. The pressure differential on opposite sides of poppet valve 21 will hold the valve 21 on its upper seat 24. Valve 21 will remain open until the pressure on its underside has diminished at which time the valve 21 will close due to gravity acting on it.

Obviously many modifications and variations of the present invention are possible in the light of the above teachings. It is therefore to be understood that within the scope of the appended claims, the invention may be practiced otherwise than as specifically described.

What is claimed is:

1. A valve for a fluid control system comprising a valve body having a valve chamber, valve seating means within said valve body, an inlet and outlet port connected to said valve chamber, a valve member operably mounted at one end of a valve stem within said valve body to control the flow of fluid passing through said inlet and outlet, vent means operably connected to the interior of said body and said outlet when said valve member is in closed position, locking means for maintaining said valve member in a closed position, retaining means for holding said locking means in locked position, said retaining means comprising a safety lock member, a valve release yoke and a ball retaining sleeve, said safety lock member engages the underside of said valve release yoke thus preventing said ball retaining sleeve from being lowered and thereby release said locking means, means for releasing said locking and retaining means whereby said valve member may be unseated by inlet pressure acting on its underside.

2. A valve for a fluid control system comprising a valve body having a valve chamber, valve seating means within said valve body, an inlet and outlet port connected to said valve chamber, a valve member operably mounted in said valve body to control the flow of fluid passing through said inlet and outlet, adjusting means operatively connected to said valve members for controlling the pressure at which said valve member will seat upon said seating means, vent means operably connected to the interior of said body and said outlet, locking means for maintaining said valve member in a closed position, retaining means for holding said locking means in locked position, said retaining means comprising a safety lock member, a valve release yoke and a ball retaining sleeve, said safety lock member engages the underside of said valve release yoke thus preventing said ball retaining sleeve from being lowered and thereby release said locking means, means for releasing said locking and retaining means whereby said valve member may be unseated by inlet pressure acting on its underside.

3. A valve for a fluid control system as described in claim 1 wherein said valve seating means consists of a first and second valve seat, said first valve seat being an integral part of a removable plug which is inserted into a bore in the lower portion of said valve body, said second valve seat being formed integrally in the upper portion within the interior of said valve body.

4. A valve for a fluid control system as described in claim 1 wherein said locking means for maintaining said valve member in a closed position consists of a valve adjusting screw that abuts the other end of said valve stem, a locking sleeve surrounding said valve stem and said adjusting screw, a plurality of detents in the outer wall of said locking sleeve, said detents being spaced circumferentially about said outer wall, a plurality of retaining balls positioned in apertures in said valve body, a ball retaining sleeve for holding said balls within said apertures and in engagement with said detents whereby said valve member is prevented from moving when said retaining balls are in said position.

5. A valve for a fluid control system as described in claim 1 wherein said means for releasing said locking and retaining means consists of a pair of solenoids, each of said solenoids operatively connected to said locking and retaining means respectively, activation of said locking solenoid permits said valve release yoke to be lowered and activation of said retaining solenoid lowers said valve release yoke thus permitting said ball retaining sleeve to be lowered, said locking means comprising a plurality of balls that extend through apertures provided in the upper portion of said valve body, a locking sleeve having a plurality of detents therein to receive a portion of each of said locking balls, allowing said locking balls to be released from said detents, thereby permitting the fluid pressure in said inlet to force said valve member off its valve seat and permit the flow of fluid through said inlet and outlet.

6. A valve for a fluid control system comprising a valve body having a valve chamber, first valve seating means in said valve chamber, an inlet port and an outlet port communicating with said valve chamber, a centrally located bore extending the entire length of said valve body and communicating with said inlet port, outlet port and valve chamber, second valve seating means fixedly secured in said bore above said outlet port, a valve stem reciprocably mounted in said central bore, a valve member secured to one end of said valve stem, said valve stem and valve member being movable between a first and second position, in said first position said valve member seats on said first seating means to close off communication between said inlet and outlet ports, a vent port interconnecting said outlet port with the atmosphere via said central bore when said valve member is in said first position, first locking means for holding said valve member in its first position, adjustment means for controlling the pressure at which said valve member will seat upon said first seating means, retaining means for holding said locking means in locked position, second locking means for preventing said retaining means from inadvertently releasing said first locking means, said retaining means comprising a safety lock member, a valve release yoke and a ball retaining sleeve, said safety lock member engages the underside of said valve release yoke thus preventing said ball retaining sleeve from being lowered and thereby release said locking means, means for retracting said second locking means and said retaining means whereby said valve member is urged into said second position by the force of incoming fluid acting on said valve member.

References Cited in the file of this patent

UNITED STATES PATENTS

| | | |
|---|---|---|
| 1,147,968 | Obert | July 27, 1915 |
| 1,925,958 | Giles | Sept. 5, 1933 |
| 2,363,117 | Butler | Nov. 21, 1944 |
| 2,688,462 | Barbehenn | Sept. 7, 1954 |
| 2,723,681 | MacGlashan | Nov. 15, 1955 |
| 2,778,599 | Paul | Jan. 22, 1957 |
| 2,839,929 | Hurlburt | June 24, 1958 |
| 2,846,180 | Kongelbeck | Aug. 5, 1958 |

FOREIGN PATENTS

| | | |
|---|---|---|
| 636,610 | Great Britain | May 3, 1950 |